United States Patent [19]

Gagliani et al.

[11] Patent Number: 4,604,409

[45] Date of Patent: Aug. 5, 1986

[54] POLYAMIDE-IMIDE FOAMS AND METHODS OF MAKING SAME

[76] Inventors: John Gagliani, 6280 Larce Pl., San Diego, Calif. 92120; John V. Long, 1756 E. Lexington Pl., El Cajon, Calif. 92021

[21] Appl. No.: 744,419

[22] Filed: Jun. 13, 1985

[51] Int. Cl.$^4$ ................................................ C08J 9/08
[52] U.S. Cl. ..................... 521/157; 521/155; 521/163; 521/183; 521/185; 521/189
[58] Field of Search ............... 521/183, 189, 185, 155, 521/163, 157

[56] References Cited

U.S. PATENT DOCUMENTS

| | | | |
|---|---|---|---|
| 3,697,484 | 10/1972 | Zecher | 521/157 |
| 3,790,530 | 8/1974 | Korner et al. | 521/157 |
| 4,026,833 | 5/1977 | D'Alelio | 521/157 |
| 4,177,333 | 12/1979 | Riccitello et al. | 521/157 |
| 4,464,489 | 8/1984 | Noda | 521/157 |

Primary Examiner—Morton Foelak
Attorney, Agent, or Firm—Frank D. Gilliam

[57] ABSTRACT

Methods of producing high molecular weight polyamide-imide foams having superior flame resistance and the foam products produced thereby. Initially, an imidocarboxylic acid is prepared by reacting a suitable oxoimine with a suitable cyclic dianhydride at a temperature of from about 25° to 250° C. in the presence of a solvent or by melt condensation without a solvent. The ratio of oxoimine to dianhydride may be varied to vary the number of imido groups in the final monomer. The imidocarboxylic acid monomer is reacted with an organic isocyanate in the presence of a suitable tertiary diamine catalyst and water to produce the polyamide-imide foam. The material foams spontaneously at room temperature. The reaction may be accelerated by heat or the addition of suitable metal salts. Additives, such as surfactants, flame retardants, fillers, etc., may be added if desired.

3 Claims, No Drawings

POLYAMIDE-IMIDE FOAMS AND METHODS OF MAKING SAME

BACKGROUND OF THE INVENTION

This invention relates in general to polyamide-imide resins and, more specifically, to improved methods for making high molecular weight, flame resistant modified polyamide-imide foams.

Prior U.S. Pat. Nos. 4,161,477, 4,183,838 and 4,183,839 disclosed and claimed certain polyimide compositions and methods of producing adhesive and coating products using those compositions.

The coating and adhesive compositions described in these patents are made by reacting an aromatic tetracarboxylic acid dianhydride with an oxoimine to produce a bisimide, which is then mixed with an inert solvent and a diamine, producing a viscous fluid containing an intimate, unpolymerized mixture of N-substituted cyclic bisimide dicarboxylic acid and diamine which is capable of being converted to a high molecular weight polymer by the application of heat.

When coated on a surface or layered between two surfaces and heated to a temperature in the range of about 177° to 316° C. a tough highly adherent coating or adhesive results. This material was not, however, suitable for use in applications requiring a cellular or foam material, since conventional agitation foaming and addition of known blowing agents add to process costs and complexity and are not entirely effective at the relatively high polymerization temperature required.

A method of producing polyimide foams which overcomes many of these problems is described in our earlier U.S. Pat. Nos. 4,394,464 and 4,426,463. In that method an aromatic dianhydride is reacted with an oxoimine at a temperature of about 190° C. to produce an N-substituted aliphatic imide. The resulting product is cooled below about 70° C. and dissolved in a reactive solvent esterifying agent and heated to reflux for at least 60 minutes to esterify the imide. The material is dried, ground to a powder, then heated to at least 200° C. to cause foaming. An excellent, flexible foam results.

Recently, in our co-pending U.S. patent application Ser. No. 678,992, filed Dec. 6, 1984, now U.S. Pat. No. 4,539,336 we disclosed and claimed another foam producing process which could be varied during processing to produce foams varying from almost entirely polyimide-amide to mixed polyimide and polyimide-amide. An aromatic dianhydride is reacted with an oxoimine in alcohol at 60° to 120° C. followed by adding a diamine, drying to a powder, then heating to melt and foam. The type of polymer and, accordingly, the corresponding physical characteristics depend upon the foaming temperature, in the overall 230° to 315° C. range. While foam physical properties could be easily selected, this process requires high processing temperatures and several complex operations.

While the prior art techniques often produced excellent foams, those methods are undesireably complex, requiring a number of sequential steps to be carefully performed at varying, relatively high temperatures. This tended to result in high energy costs and sometimes varying product quality due to processing variations.

Thus, there is a continuing need for improved methods of producing foams having processing simplicity and low temperature processing, together with superior flexibility and flame resistance.

SUMMARY OF THE INVENTION

The above-noted problems, and others, are overcome by a foam composition made by a method which comprises, basically, the steps of producing an imidocarboxylic acid by reacting a suitable oxoimine with a suitable dianhydride at a temperature of from about 25° to 250° C. in a mole ratio of oxoimine to dianhydride of from about 0.1:1 to 10:1, mixing therewith a suitable organic isocyanate in a mole ratio of isocyanate to imidocarboxylic acid of from about 1.0 to 5.0, in the presence of a suitable quantity of a tertiary amine catalyst and about 0.05 parts by weight water, based on the weight per one part of the imidocarboxylic acid. The mixture spontaneously foams and cures to a flexible, resilient product which is self-extinguishing after exposure to open flame.

The following is exemplary of the reaction which appears to take place between the imidocarboxylic acid and the organic isocyanate to produce the polyamide-imide foam:

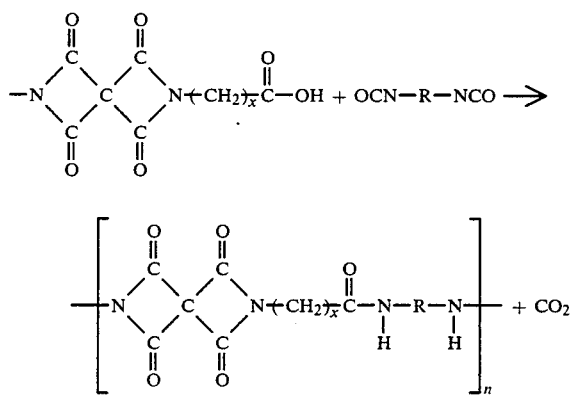

In this reaction "R" may be any suitable alkyl, aryl, substituted aryl or substituted alkyl radical. In general, best results are obtained with aryl radicals.

The reaction may be accelerated by heat, typically in the 50° to 100° C. range, and/or the addition of suitable metal salts, typically about 3 parts by weight based on 100 parts by weight of the isocyanate. Surfactants are preferrably added to reduce the surface tension of the rising mass and reduce voids and imperfections. Flame retardant additives may be added, if desired, to further increase the flame resistance of the foam.

DETAILED DESCRIPTION OF THE INVENTION

Any suitable imidocarboxylic acid (a cyclic tetracarboxylic acid containing a functional imido group) may be reacted with the isocyanate to produce the foam of this invention. Typical imidocarboxylic acids include benzophenonetetracarboxyimidocaproic acid monoanhydride, benzenetetracarboxyimidocaproic acid monoanhydride, benzophenonetetracarboxy-bisimidocaproic acid, benzenetetracarboxy-bisimidocaproic acid, oligomers consisting essentially of benzophenonetetracarboxy-bisimidocaproic acid or benzenetetracarboxy-bisimidocaproic acid and mixtures thereof.

While the imidocarboxylic acid may be prepared in any suitable manner, it is preferred that it be prepared by reacting a suitable oxoimine (a cylic lactam) with a suitable aromatic dianhydride in desired proportions. Typical aromatic dianhydrides include those described and referenced in the patents listed above. Due to their ready availability at reasonable prices and the excellent foams which result, pyromettitic dianhydride, 3,3', 4,4'-benzophenone tetracarboxylic acid dianhydride, and mixtures thereof are preferred. While any suitable oxoimine may be used, the preferred oxoimines have the following general formula:

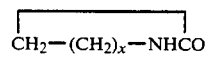

where "x" is a positive integer from 1 to 7. Of these, best results are obtained with caprolactam. Other preferred oxoimines include 2-piperidone, 2-pyrrolidone and amino acids derived from these three preferred cyclic lactams, namely 6-amino caproic acid, 5-amino valeric acid and 4-amino butyric acid. These preferred oxoimines may be used alone or combined in any suitable mixture. For the purposes of this patent application the term "oxoimine" will be understood to include cyclic lactams as described above and in the three amino acids mentioned in this paragraph.

For best results, the mole ratio of oxoimine to dianhydride should be in the 0.1:1 to 10:1 range. At a ratio of 1:1 a monoimidocarboxylic acid is obtained, while at a ratio of 2:1 a bis-imidocarboxylic acid results. At ratios lower than 1:1 the number of the imido groups in the final monomer is reduced accordingly and at ratios higher than 2:1 a condensation polymerization may occur through extension of the lactam.

The imidocarboxylic acid monomers are reacted with any suitable organic isocyanate to produce the polyamide-imide foam. Typical isocyanates include 4,4'-diphenylmethane diisocyanate, 2,4-toluene diisocyanate, 1,6-hexamethylene diisocyanate and polymeric diisocyanate. Of these, best results are obtained with the polymeric diisocyanate commonly known as PAPI 96, which is, therefore, preferred.

Any suitable proportion of isocyanate to monomer may be used. Good results are obtained with 100 to 500 parts by weight of isocyanate per 100 parts by weight of the imidocarboxylic acid. Best results are obtained at 150 parts.

An appropriate quantity of a suitable tertiary amine catalyst is added to the isocyanate/monomer mixture, together with a suitable quantity of water. Typical tertiary amines include triethyl amine, N-methylmorpholine, diethylethanolamine, ethyl pyridine, methyl ethyl pyridine and mixtures thereof. Best results are obtained with N-methyl morpholine. Any suitable quantity of catalyst may be used. Good results are obtained with about 1.0 to 5.0 parts by weight of catalyst per 100 parts by weight of the diisocyanate with best results at 2.0 parts. Water is added to start the foaming reaction. Good results are obtained with 2.0 to 8.0 parts by weight water, per 100 parts by weight of the imidocarboxylic acid, with best results at 5 parts.

The polymerization/foaming reaction may take place under any suitable conditions. While the reaction will proceed successfully at room temperature, the reaction may be accelerated at slightly elevated temperatures, typically in the range of about 50° to 100° C.

If desired, the reaction may be accelerated by the addition of from about 1.0 to 5.0 weight percent, based on the isocyanate, of a suitable metal salt catalyst. Typical metal salt catalysts include tin oxide, tin acetate, zinc chloride, cobalt acetate, boron fluoride and mixtures thereof. Best results are obtained with about 3 wt % of dibutyl tin diacetate.

Surfactants may be added to improve foam uniformity and reduce voids and other imperfections, if desired. Typical surfactants include Dow Corning 190 or 193 (silicone surfactants), FC430 from Minnesota Mining and Manufacturing Co., Zonyl FSC from E. I. duPont deNemours & Co., L550 from Union Carbide Corp., and BRIJ-78, a polyoxyethylene ether from ICI America. Best results are obtained with silicone surfactants, which are, therefore, preferred. We have found that DC193, a silicone surfactant from Dow Corning, produces optimum results. For best results, from about 1 to 2 wt % of surfactant is used, based on imido carboxylic acid weight.

Flame retardant additives may be added to improve the already high flame resistance of the foams. These include aluminum hydroxide, zinc borate, chlorinated compounds, phosphates such as tricresyl phosphate and chloroaryl phosphate, borates, fully cured polyimide powders and mixtures thereof. In general, about 10 to 50 wt %, based on total weight is effective.

Other additives, such as ultraviolet absorbers, reinforcing fibers, fillers, etc., may be added in any suitable quantity prior to adding the organic catalyst and water.

Details of the invention will be further understood upon reference to the following examples, which describe preferred embodiments of the methods and compositions of this invention. All parts and percentages are by weight unless otherwise indicated.

EXAMPLE I

About 322.23 g, 1M, of 3,3', 4,4'-benzophenonetetracarboxylic acid dianhydride and about 113.6 g, 1M, of caprolactam are charged into a two liter flask and heated to about 190° C. for about 0.5 to 5 hours. The reaction mixture is transferred, while hot, into an open dish and allowed to cool to room temperature. The solid product is crushed, pulverized and screened through a U.S. mesh screen, #50. The product obtained is essentially benzophenonbetetracarboxyimido monoanhydride. About 30 g of the product and about 1.9 g, of diethylethanolamine and about 51.0 g, of PAPI 94, a polymeric diisocyanate which is a product of the Upjohn Corp. and about 16.0 g water are added to the mixture, which is stirred well. The mixture spontaneously foams. After about 30 minutes the foam cures to a dry, flexible foam which is self extinguishing after exposure to open flame.

EXAMPLE II

About 226.3 g, 2M, of caprolactam is reacted with 1M, about 322.2 g, of 3,3', 4,4'-benzophenonetetracarboxylic acid dianhydride in a two liter flask, with the reactants heated to about 210° C. The product is a solid consisting of benzophenonetetracarboxy bis-imidocaproic acid. About 18.2 g of this product is mixed in a beaker with about 4.5 g of DC 193 silicone surfactant from Dow Corning and about 3 g of N-methylmorpholine and stirred for about 8 minutes. To the mixture is added about 19.6 g of a polymeric isocyanate available from Upjohn under the PAPI 94 designation. About 1.3 g of water is stirred into the mixture. The mixture spontaneously foams, producing a flexible, flame resistant foam product.

EXAMPLE III

The procedure of Example II is repeated, except that the anhydride is benzene tetracarboxylic acid dianhydride. An excellent, flexible foam results.

EXAMPLE IV

The procedure of Example II is repeated with additional samples, with the following oxoimines substituted for the caprolactam: IV(a) 2M of 2-piperidone, IV(b) 2M of 2-pyrrolidone, IV(c) 2M of 6-amino caproic acid, and IV(d) 2M of 4-amino butyric acid. In each case an excellent foam results.

EXAMPLE V

The procedure of Example II is repeated, except that in place of the 19.6 g of PAPI 94 polymeric isocyanate, the following organic isocyanates are used: V(a) 19.6 g of 4,4′-diphenylmethane diisocyanate, and V(b) 14 g of 2,4-toluene diisocyanate. In each case, an excellent flame resistant foam results.

EXAMPLE VI

The procedure of Example I is repeated, except that in place of the diethylethanolamine, the following tertiary amines are used: VI(a) 1.9 g of triethyl amine, VI(b) 1.9 g of N-methylmorpholine, VI(c) 1.9 g of ethyl pyridine, and VI(d) a mixture of 10 g diethylethanolamine and 10 g of methyl ethyl pyridine. Foams of excellent properties result.

EXAMPLE VII

The procedure of Example II is repeated, except that the quantity of water is varied as follows: VII(a) no water, VII(b) 0.3 g water, VII(c) 1.0 g water, VII(d) 2.5 g water, VII(e) 5 g water and VII(f) 10 g water. With no water, no foam results. In the other sub-examples, best results are obtained with 2.5 g of the water. With the very large quantities of water, the foam is impregnated with excess water.

EXAMPLE VIII

The procedure according to Example I is repeated with the exception that the temperature of the reaction between the imidocarboxylic acid and the isocyanate is varied as follows: VIII(a) 20° C., VIII(b) 50°, VIII(c) 100° C., VIII(d) 250° C. Best results are obtained with 50° C. conditions. Lower temperatures result in good foam, while higher temperatures result in foam collapse.

EXAMPLE IX

The procedures of Example II are repeated, with the addition of the following metal salts as catalysts added just before the addition of water: IX(a) 0.8 g tin oxide, IX(b) 0.8 g of dibutyl tin diacetate, IX(c) 0.8 zinc chloride, IX(d) a mixture of 0.4 g cobalt acetate and 0.4 g boron fluoride. In all cases a foam is obtained but IX(b) produced a foam with very little unreacted skin.

EXAMPLE X

The procedures of Example I are repeated except that the following additives are added just before addition of the water: X(a) 20 g aluminum hydroxide, X(b) 20 g tricresylphosphate, X(c) a mixture of 10 g zinc borate and 10 g triphenyl phosphate, X(d) 20 g of finely divided, fully cured polyimide powder prepared as described in U.S. Pat. No. 4,161,477, X(e) 20 g finely divided glass fibers, and X(f) 20 g chopped graphite fibers. The foams produced in sub-examples X(a) through X(d) are found to have superior flame resistance while those of sub-examples X(e) and X(f) are found to have increased compressive strength.

EXAMPLE XI

The procedures of Example I are repeated, with the foamable material being shaped as follows immediately after the water is added: XI(a) the foam is placed in a conventional vented box-like mold, resulting in a rectangular foam block or bun, XI(b) the foam is extruded from a conventional extrusion device as it foams to produce rod-like foam structures, and XI(c) the material is spread on a moving belt as it foams, resulting in a long foam sheet.

Although specific components, proportions and conditions have been specified in the above examples, these may be varied with similar results. In addition, other materials may be added to the foamable material, such as fillers, colorants, ultraviolet absorbers or the like.

We claim:

1. A polyamide-imide foam composition comprising a polymer having the recurring unit

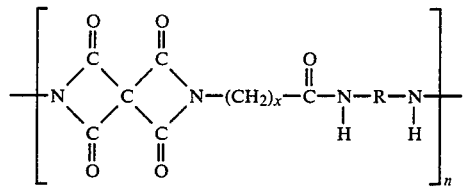

wherein "n" is a positive integer, "R" is a radical selected from the group consisting of alkylene and phenylene radicals, which may have alkyl or aryl substituents and "x" is from 1 to 6.

2. The composition according to claim 1 wherein "x" is 1 to 6.

3. The composition according to claim 1 wherein "R" is alkyl, aryl, substituted aryl or substituted alkyl.

* * * * *